US012649445B2

(12) United States Patent
Bang et al.

(10) Patent No.: US 12,649,445 B2
(45) Date of Patent: Jun. 9, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventors: Kyung Joo Bang, Hwaseong-Si (KR); Jeong Ki Hong, Seongnam-Si (KR); Jae Woong Hwang, Seoul (KR); Dong Hyuk Kim, Hanam-si (KR); Il Hwan Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 31 days.

(21) Appl. No.: 18/740,822

(22) Filed: Jun. 12, 2024

(65) Prior Publication Data

US 2025/0206270 A1 Jun. 26, 2025

(30) Foreign Application Priority Data

Dec. 26, 2023 (KR) ........................ 10-2023-0191638

(51) Int. Cl.
B60T 7/12 (2006.01)
(52) U.S. Cl.
CPC ............. B60T 7/12 (2013.01); B60T 2250/04 (2013.01)
(58) Field of Classification Search
CPC ...... B60T 7/12; B60T 2250/804; B60T 8/172; B60T 8/171; B60T 8/321; B60Y 2400/81
See application file for complete search history.

(56) References Cited

U.S. PATENT DOCUMENTS

| | | | |
|---|---|---|---|
| 11,872,975 B2 | 1/2024 | Hwang | |
| 12,049,224 B2 * | 7/2024 | Jin | ........................ B60W 20/30 |
| 2003/0184155 A1 * | 10/2003 | Crombez | ................ B60T 13/66 |
| | | | 303/152 |
| 2018/0319380 A1 * | 11/2018 | Laine | .................. B60W 10/184 |
| 2021/0370899 A1 | 12/2021 | Hwang | |
| 2024/0140380 A1 * | 5/2024 | Kim | ......................... B60L 7/26 |
| 2025/0269736 A1 * | 8/2025 | Lee | ..................... B60L 15/2036 |

FOREIGN PATENT DOCUMENTS

| | | |
|---|---|---|
| KR | 10-2005-0112517 A | 11/2005 |
| KR | 10-2021-0148633 A | 12/2021 |

OTHER PUBLICATIONS

Chen Lv, et al. "Regenerative Braking Control Algorithm for an Electrified Vehicle Equipped with a By-Wire Brake System" SAE 2014 World Congress, DOI10.42712014-01-1791.

* cited by examiner

*Primary Examiner* — George C Jin
(74) *Attorney, Agent, or Firm* — Banner & Witcoff, Ltd.

(57) ABSTRACT

An apparatus for a vehicle to manage different braking modes is introduced. The apparatus may use a control device, along with sensors and memory, to monitor acceleration error and a real-time driving mode. Based on information about the acceleration error and the real-time driving mode and predefined reference values, the control device may switch between driving mode, auxiliary braking mode, simultaneous braking mode, or main braking reduction mode. This may enable the vehicle to optimize braking based on real-time conditions.

20 Claims, 9 Drawing Sheets

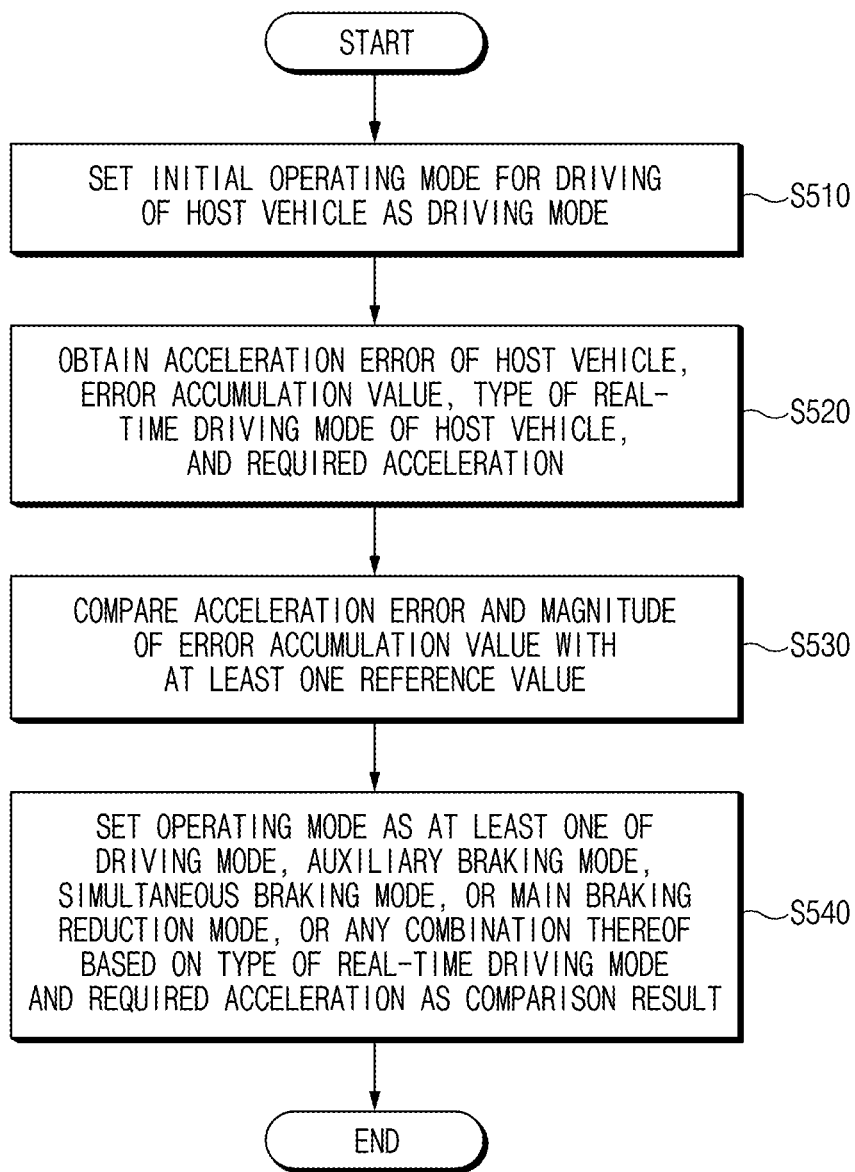

START

SET INITIAL OPERATING MODE FOR DRIVING
OF HOST VEHICLE AS DRIVING MODE                 ~S510

OBTAIN ACCELERATION ERROR OF HOST VEHICLE,
ERROR ACCUMULATION VALUE, TYPE OF REAL-
TIME DRIVING MODE OF HOST VEHICLE,             ~S520
AND REQUIRED ACCELERATION

COMPARE ACCELERATION ERROR AND MAGNITUDE
OF ERROR ACCUMULATION VALUE WITH               ~S530
AT LEAST ONE REFERENCE VALUE

SET OPERATING MODE AS AT LEAST ONE OF
DRIVING MODE, AUXILIARY BRAKING MODE,
SIMULTANEOUS BRAKING MODE, OR MAIN BRAKING
REDUCTION MODE, OR ANY COMBINATION THEREOF     ~S540
BASED ON TYPE OF REAL-TIME DRIVING MODE
AND REQUIRED ACCELERATION AS COMPARISON RESULT

END

FIG.5

APPARATUS FOR CONTROLLING AUTONOMOUS DRIVING AND METHOD THEREOF

CROSS-REFERENCE TO RELATED APPLICATION

This application claims the benefit of priority to Korean Patent Application No. 10-2023-0191638, filed in the Korean Intellectual Property Office on Dec. 26, 2023, the entire contents of which are incorporated herein by reference.

TECHNICAL FIELD

The present disclosure relates to a vehicle control apparatus and a method thereof, and more particularly, relates to a technology for efficiently performing, based on selectively using a plurality of braking devices, braking control on a host vehicle.

BACKGROUND

If a situation requiring deceleration (or stopping) is identified while driving control is performed on a host vehicle, various algorithms performing braking control (or stopping control) may be developed. In the meantime, according to the type of a vehicle, there may be a vehicle equipped with a plurality of braking devices. For example, a vehicle (e.g., an electric vehicle and/or hybrid vehicle) including a regenerative braking device or a vehicle (e.g., a large truck and/or bus) including a retarder, an engine brake, an exhaust brake, or the like may include an additional auxiliary braking device in addition to a main braking device.

For example, the required acceleration may be calculated to control a vehicle including the plurality of braking devices. The braking torque for following the required acceleration may be calculated, and the calculated braking torque may be distributed to the main braking device and the auxiliary braking device. In particular, braking torque may be preferentially distributed to the auxiliary braking device, and the extent to which the performance limit of the auxiliary braking device is exceeded may be distributed to the main braking device.

However, the above-described braking control method relatively may highly depend on the accuracy of a vehicle model. To increase the accuracy of the vehicle model, an expensive sensor or a large amount of calculation results may be used.

Furthermore, information (e.g., a gradient of a driving road, a weight of the host vehicle, a friction coefficient of a road surface, or the like) incapable of being directly obtained due to the performance limit of a controller may be used as a predictive value, and thus there is difficulty in increasing accuracy for following the required or desired acceleration.

SUMMARY

According to the present disclosure, an apparatus may comprise a first braking device and a second braking device, a sensor device, a memory configured to store at least one instruction, and a control device operatively coupled to the first braking device, the second braking device, the sensor device, and the memory, wherein the at least one instruction, if executed by the control device, causes the apparatus to set an operating mode of a vehicle as a driving mode, obtain, based on information from the sensor device, an acceleration error value of the vehicle, an accumulation value of the acceleration error value, and a type of a real-time driving mode of the vehicle, and required acceleration, compare the acceleration error value, a magnitude of the accumulation value of the acceleration error value, and at least one reference value, set, based on the comparison, the required acceleration, and the type of the real-time driving mode, the operating mode of the vehicle as at least one of the driving mode, an auxiliary braking mode, a simultaneous braking mode, or a main braking reduction mode, and output, based on the operating mode, a signal for an operation control of the vehicle.

The apparatus, wherein the at least one instruction, if executed by the control device, causes the apparatus to compare the acceleration error value, a magnitude of the accumulation value of the acceleration error value, and at least one reference value by: comparing the acceleration error value and a reference acceleration error value and comparing the magnitude of the accumulation value of the acceleration error value and a reference accumulation value.

The apparatus, wherein the at least one instruction, if executed by the control device, causes the apparatus to obtain, based on information from the sensor device, braking device information may comprise usage information of the first braking device and information about whether the required acceleration matches a performance limit of the second braking device, and set, further based on the braking device information, the operating mode.

The apparatus, wherein the at least one instruction, if executed by the control device, causes the apparatus to based on the real-time driving mode of the vehicle being the driving mode set, based on the acceleration error value being smaller than a first error value and the accumulation value of the acceleration error being value smaller than a first accumulation value, the operating mode as the auxiliary braking mode, and maintain, based on the acceleration error value being greater than or equal to the first error value or the accumulation value of the acceleration error value being greater than or equal to the first accumulation value, the operating mode as the driving mode.

The apparatus, wherein the at least one instruction, if executed by the control device, causes the apparatus to based on the real-time driving mode of the vehicle not being the driving mode set, based on the acceleration error value exceeding a second error value and the accumulation value of the acceleration error value exceeding a second accumulation value, the operating mode as the driving mode, and determine, based on the acceleration error value being smaller than or equal to the second error value, or the accumulation value of the acceleration error value being smaller than or equal to the second accumulation value, whether the real-time driving mode is the auxiliary braking mode.

The apparatus, wherein the at least one instruction, if executed by the control device, causes the apparatus to based on the real-time driving mode being the auxiliary braking mode set, based on the acceleration error value being smaller than a third error value and the accumulation value of the acceleration error value being smaller than a third accumulation value, or the required acceleration exceeding a performance limit of the second braking device, the operating mode as the simultaneous braking mode, and maintain, based on the acceleration error value being greater than or equal to the third error value, the accumulation value of the acceleration error value being greater than or equal to the third accumulation value, and the required acceleration being within the performance limit of the second braking device, the operating mode as the auxiliary braking mode.

The apparatus, wherein the at least one instruction, if executed by the control device, causes the apparatus to determine, based on the real-time driving mode not being the auxiliary braking mode, the real-time driving mode as the simultaneous braking mode, set, based on the acceleration error value exceeding a fourth error value, the accumulation value of the acceleration error value exceeding a fourth accumulation value, and the required acceleration being within a performance limit of the second braking device, the operating mode as the auxiliary braking mode, and maintain, based on the acceleration error value being smaller than or equal to the fourth error value, the accumulation value of the acceleration error value being smaller than or equal to the fourth accumulation value, or the required acceleration exceeding the performance limit of the second braking device, the operating mode as the simultaneous braking mode.

The apparatus, wherein the at least one instruction, if executed by the control device, causes the apparatus to based on the acceleration error value being smaller than or equal to the fourth error value, the accumulation value of the acceleration error value being smaller than or equal to the fourth accumulation value, or the required acceleration exceeding the performance limit of the second braking device set, based on the acceleration error value exceeding a fifth error value and the accumulation value of the acceleration error value exceeding a fifth accumulation value, the operating mode as the main braking reduction mode, and maintain, based on the acceleration error value being smaller than or equal to the fifth error value or the accumulation value of the acceleration error value being smaller than or equal to the fifth accumulation value, the operating mode as the simultaneous braking mode.

The apparatus, wherein the at least one instruction, if executed by the control device, causes the apparatus to determine, based on the real-time driving mode not being the auxiliary braking mode or the simultaneous braking mode, the real-time driving mode as the main braking reduction mode, and set, based on the acceleration error value exceeding a sixth error value, the operating mode as the simultaneous braking mode.

The apparatus, wherein the at least one instruction, if executed by the control device, causes the apparatus to obtain, based on information from the sensor device and the acceleration error value being smaller than or equal to the sixth error value, a usage value of the first braking device, and set, based on the usage value being smaller than a specified usage value and the required acceleration being within the performance limit of the second braking device, the operating mode as the auxiliary braking mode.

The apparatus, wherein the at least one instruction, if executed by the control device, causes the apparatus to obtain, based on information from the sensor device and the acceleration error value being smaller than or equal to the sixth error value, a usage value of the first braking device, and maintain, based on the usage value exceeding a specified usage value or the required acceleration exceeding the performance limit of the second braking device, the operating mode as the main braking reduction mode.

According to the present disclosure, a method may comprise setting, by a control device, an operating mode of a vehicle as a driving mode, obtaining, based on information from a sensor device, an acceleration error value of the vehicle, an accumulation value of the acceleration error value, and a type of a real-time driving mode of the vehicle, and required acceleration, comparing, by the control device, the acceleration error value a magnitude of the accumulation value of the acceleration error value, and at least one reference value, setting, by the control device, based on the comparing, the required acceleration, and the type of the real-time driving mode, an operating mode of the vehicle as at least one of the driving mode, an auxiliary braking mode, a simultaneous braking mode, or a main braking reduction mode, and outputting, by the control device, based on the operating mode, a signal for an operation control of the vehicle.

The method, wherein the comparing comprises comparing the acceleration error value and a reference acceleration error value and comparing the magnitude of the accumulation value of the acceleration error value and a reference accumulation value.

The method may further comprise obtaining, by the control device, based on information the sensor device, braking device information may comprise usage information of a first braking device and information about whether the required acceleration matches a performance limit of a second braking device, and setting, further based on the braking device information, the operating mode.

The method may further comprise based on the real-time driving mode of the vehicle being the driving mode setting, by the control device, based on the acceleration error value being smaller than a first error value and the accumulation value of the acceleration error value being smaller than a first accumulation value, the operating mode as the auxiliary braking mode, or maintaining, by the control device, the operating mode as the driving mode based on the acceleration error value being greater than or equal to the first error value or the accumulation value of the acceleration error value being greater than or equal to the first accumulation value.

The method may further comprise based on the real-time driving mode of the vehicle not being the driving mode setting, by the control device, based on the acceleration error value exceeding a second error value and the accumulation value of the acceleration error value exceeding a second accumulation value, the operating mode as the driving mode, or determining, by the control device, based on the acceleration error value being smaller than or equal to the second error value or the accumulation value of the acceleration error value being smaller than or equal to the second accumulation value, whether the real-time driving mode is the auxiliary braking mode.

The method may further comprise based on the real-time driving mode being the auxiliary braking mode setting, by the control device, based on the acceleration error value being smaller than a third error value and the accumulation value of the acceleration error value being smaller than a third accumulation value or the required acceleration exceeding a performance limit of a second braking device, the operating mode as the simultaneous braking mode, or maintaining, by the control device, based on the acceleration error value being greater than or equal to the third error value, the accumulation value of the acceleration error value being greater than or equal to the third accumulation value, and the required acceleration being within the performance limit of the second braking device, the operating mode as the auxiliary braking mode.

The method may further comprise determining, by the control device, based on the real-time driving mode not being the auxiliary braking mode, the real-time driving mode as the simultaneous braking mode, setting, by the control device, based on the acceleration error value exceeding a fourth error value, the accumulation value of the acceleration error value exceeding a fourth accumulation value, and the required acceleration being within a performance limit of a second braking device, the operating mode as the auxiliary braking mode, or maintaining, by the control device, based on the acceleration error value being smaller than or equal to the fourth error value, the accumulation value of the acceleration error value being smaller than or equal to the fourth accumulation value, or the required acceleration exceeding the performance limit of the second braking device, the operating mode as the simultaneous braking mode.

The method may further comprise based on the acceleration error value being smaller than or equal to the fourth error value, the accumulation value of the acceleration error value being smaller than or equal to the fourth accumulation value, or the required acceleration exceeding the performance limit of the second braking device setting, by the control device, based on the acceleration error value exceeding a fifth error value and the accumulation value of the acceleration error value exceeding a fifth accumulation value, the operating mode as the main braking reduction mode, or maintaining, by the control device, based on the acceleration error value being smaller than or equal to the fifth error value or the accumulation value of the acceleration error value being smaller than or equal to the fifth accumulation value, the operating mode as the simultaneous braking mode.

The method may further comprise determining, by the control device, based on the real-time driving mode not being the auxiliary braking mode or the simultaneous braking mode, the real-time driving mode as the main braking reduction mode, or setting, by the control device, based on the acceleration error value exceeding a sixth error value, the operating mode as the simultaneous braking mode.

The method may further comprise obtaining, by the control device, based on information from the sensor device and the acceleration error value being smaller than or equal to the sixth error value, a usage value of a first braking device, and setting, by the control device, based on the usage value being smaller than a specified usage value and the required acceleration being within the performance limit of the second braking device, the operating mode as the auxiliary braking mode.

The method may further comprise obtaining, by the control device, based on information from the sensor device and the acceleration error value being smaller than or equal to the sixth error value, a usage value of a first braking device, and maintaining, by the control device, based on the usage value exceeding a specified usage value or the required acceleration exceeding the performance limit of the second braking device, the operating mode as the main braking reduction mode.

BRIEF DESCRIPTION OF THE DRAWINGS

The above and other objects, features and advantages of the present disclosure will be more apparent from the following detailed description taken in conjunction with the accompanying drawings:

FIG. 5 shows an example of a flowchart of a vehicle control method, according to an example of the present disclosure.

Figure 1:
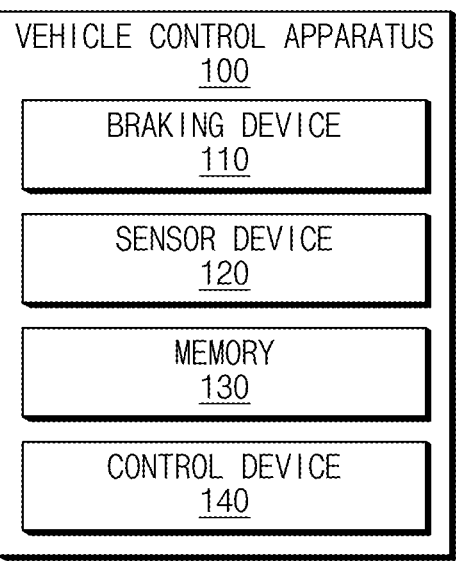
FIG. 1 shows an example of components of a vehicle control apparatus, according to an example of the present disclosure.

With regard to description of drawings, the same or similar components will be marked by the same or similar reference signs.

DETAILED DESCRIPTION

Hereinafter, some examples of the present disclosure will be described in detail with reference to the accompanying drawings. In adding reference numerals to components of each drawing, it should be noted that the same components include the same reference numerals, although they are indicated on another drawing. Furthermore, in describing the examples of the present disclosure, detailed descriptions associated with well-known functions or configurations will be omitted if they may make subject matters of the present disclosure unnecessarily obscure.

In describing elements of an example of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as including a meaning that is consistent with their meaning in the context of the present disclosure and the relevant art and will not be interpreted in an idealized or overly formal sense unless expressly so defined herein.

Hereinafter, various examples of the present disclosure will be described in detail with reference to FIGS. 1 to 6.

FIG. 1 shows an example of components of a vehicle control apparatus, according to an example of the present disclosure.

According to an example, a vehicle control apparatus 100 may include a braking device 110, a sensor device 120, a memory 130, and/or a control device 140. The configuration of the vehicle control apparatus 100 shown in FIG. 1 is an example, and examples of the present disclosure are not limited thereto. For example, the vehicle control apparatus 100 may further include components not shown in FIG. 1 (e.g., at least one of a communication device, an interface device, a display device, or a notification device, or any combination thereof).

According to an example, the braking device 110 may include at least one braking device.

For example, the braking device 110 may include a first braking device and a second braking device.

For example, the first braking device may be a main braking device (e.g., disc brakes, drum brakes), and the second braking device may be an auxiliary braking device. For example, the first braking device may include a braking device with a maximum braking output weaker than the second braking device.

For example, the second braking device may include at least one of a retarder (e.g., hydraulic retarder, electric retarder), an engine brake, an exhaust brake, or a regenerative braking brake, or any combination thereof.

According to an example, the sensor device 120 may obtain (or sense) various pieces of information used for vehicle driving.

For example, the sensor device 120 may include at least one sensor including at least one of a camera, radar, or a LiDAR, or any combination thereof.

For example, the sensor device 120 may obtain, based on at least one sensor, information about an external object (e.g., at least one of a person, another vehicle, a building, or a structure, or any combination thereof).

For example, the sensor device 120 (e.g., camera, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.) may obtain information about driving environments of the host vehicle. For example, the sensor device 120 may obtain, in real time, information about at least one of a driving direction, driving speed, acceleration, required acceleration, an error between the acceleration and the required acceleration, or an accumulation value of the acceleration error, or any combination thereof of the host vehicle. The accumulation value of the acceleration error may be the sum of errors between the acceleration accumulated over a specified period and the required acceleration.

For example, the sensor device 120 may obtain information about whether each of the braking devices included in the braking device 110 operates, and an operating history thereof.

For example, the sensor device 120 may obtain information about whether at least one other vehicle is present, and/or a driving state (e.g., at least one of driving speed, acceleration, deceleration, a driving direction, a distance from a host vehicle, or whether a vehicle is stopped, idling, or any combination thereof) of at least one other vehicle.

According to an example, the memory 130 may store instructions or data. For example, the memory 130 may store one or more instructions that cause the vehicle control apparatus 100 to perform various operations if executed by the control device 140.

For example, the memory 130 and the control device 140 may be implemented as one chipset or more chipsets. The control device 140 may include at least one of a communication processor or a modem.

For example, the memory 130 may store various pieces of information related to the vehicle control apparatus 100. For example, the memory 130 may store information about the operating history of the control device 140. For example, the memory 130 may store information related to states and/or operations of components (e.g., at least one of an engine control unit (ECU), the braking device 110, the sensor device 120, or the memory 130, or any combination thereof) of the host vehicle.

For example, the memory 130 may include different types of storage devices. For example, the memory 130 may include at least one of a random-access memory (RAM), or an embedded multi-media card (eMMC), solid-state drive (SSD) card, or any combination thereof.

For example, the RAM may temporarily (or transiently) store data (e.g., driving data) regarding the operation of the vehicle control apparatus 100 and/or the host vehicle to be controlled by the vehicle control apparatus 100. For example, the RAM may include at least one buffer. For example, the vehicle control apparatus 100 may store, in the RAM, at least one node from dividing pieces of data, which are collected (or identified) while autonomous driving control is performed on the host vehicle, based on unit times.

For example, the eMMC may include an embedded multimedia card. For example, the eMMC may store data for a longer period of time than the RAM. For example, the eMMC may be implemented as a separate memory chip separate from the RAM.

According to an example, the control device 140 may be operatively connected to the braking device 110, the sensor device 120, and/or the memory 130. For example, the controller 140 may control the operation of the braking device 110, the sensor device 120, and/or the memory 130.

For example, the control device 140 may set an initial operating mode for driving of the host vehicle as a driving mode.

For example, because there are many cases where the operating mode used while the host vehicle is driving is a drive mode, the control device 140 may set the initial operating mode as the driving mode if starting driving control of the host vehicle.

For example, the control device 140 may obtain, based on the sensor device 120, an acceleration error of the host vehicle, an accumulation value of the acceleration error of the host vehicle, the type of a real-time driving mode of the host vehicle, and required acceleration of the host vehicle.

For example, the control device 140 may identify, based on the sensor device 120, the real-time acceleration and required acceleration of the host vehicle. The control device 140 may identify, based on at least one of the host vehicle's driving situation, driving speed, driving acceleration, road information, or traffic information, or any combination thereof, the required acceleration for driving control for the host vehicle.

For example, the acceleration error may be a difference between the host vehicle's acceleration and the required acceleration.

For example, the accumulation value of the acceleration error may be the sum of acceleration errors obtained during a specified period.

For example, the type of the driving mode may include at least one of a driving mode, an auxiliary braking mode, a simultaneous braking mode, or a main braking reduction mode, or any combination thereof.

For example, the driving mode may be an operating mode for driving, based on a driving device, the host vehicle while the operation of the braking device 110 is minimized or stopped.

For example, the auxiliary braking mode may be an operating mode for braking, based on only the second braking device (or an auxiliary braking device) among a plurality of braking devices included in the braking device 110, the host vehicle.

For example, the simultaneous braking mode may be an operating mode for braking, based on both the first braking device (or a main braking device) and the second braking device among the plurality of braking devices included in the braking device 110, the host vehicle.

For example, the main braking reduction mode may be an operating mode for braking, based on both the first braking device and the second braking device among the plurality of braking devices included in the braking device 110, the host vehicle, and may be an operating mode for braking, based on reducing the braking force of the first braking device and further using the second braking device, the host vehicle.

For example, the control device 140 may compare an acceleration error and a magnitude of an accumulation value of the acceleration error with at least one reference value.

For example, the control device 140 may compare the acceleration error with at least one error reference value, and may then obtain the comparison result from comparing the accumulation value of the acceleration error with at least one accumulation reference value.

For example, as the result of comparison between an acceleration error and an accumulation value of the acceleration error and at least one reference value, the control device 140 may set (or maintain) the operating mode of the host vehicle as at least one of a driving mode, an auxiliary braking mode, a simultaneous braking mode, or a main braking reduction mode, or any combination thereof based on the of type the real-time driving mode and the required acceleration of the host vehicle.

For example, the control device 140 may obtain, based on the sensor device 120, braking device information including the usage of the first braking device, and whether the required acceleration matches the performance limit (e.g., ability to bring a vehicle to a complete stop from a certain speed with a specific distance for a given weight of the vehicle, time it takes to bring the vehicle to a complete stop from a certain speed after braking is applied, ability of a brake to precisely control the braking force applied, etc.) of the second braking device (e.g., engine brake, exhaust brake, hydraulic retarder, electric retarder, regenerative brake, etc.). The control device 140 may determine, based on further using the braking device information, the operating mode.

For example, if the second braking device is a regenerative braking brake, the control device 140 may determine that the performance limit of the second braking device is exceeded (or that the second braking device is unavailable), based on identifying the host vehicle's battery SoC as a specified SoC.

For example, if the second braking device is an engine brake and/or an exhaust brake, the control device 140 may determine that the performance limit of the second braking device is exceeded (or that the second braking device is unavailable), based on identifying the host vehicle performing the shift.

For example, if the second braking device is a retarder r an auxiliary braking system (e.g., hydraulic retarder, electric retarder), the control device 140 may determine that the performance limit of the second braking device is exceeded (or that the second braking device is unavailable), based on identifying that the engine RPM is smaller than a specified RPM.

For example, if it is determined that the braking force according to the required acceleration is incapable of being generated even though the second braking device is maximally used, the control device 140 may determine that using only the second braking device is insufficient, because the required acceleration exceeds the performance limit of the second braking device.

For example, after identifying the real-time driving mode of the host vehicle, the control device 140 may set the operating mode of the host vehicle from a real-time operating mode to another mode or may maintain the real-time operating mode, based on the real-time driving mode, an acceleration error (e.g., over-acceleration or under-acceleration determined based on vehicle's weight, road grade, wind resistance, etc.), and the magnitude of an accumulation value of the acceleration error.

For example, if it is determined that the real-time driving mode of the host vehicle is a driving mode, the control device 140 may compare the acceleration error with a first error, and may compare the accumulation value of the acceleration error with a first accumulation value. For example, if the acceleration error is smaller than the first error and the accumulation value of the acceleration error is smaller than the first accumulation value, the control device 140 may set (or change) the operating mode as the auxiliary braking mode. If the acceleration error is greater than or equal to the first error or the accumulation value of the acceleration error is greater than or equal to the first accumulation value, the control device 140 may maintain the operating mode as the driving mode.

For example, if it is determined that the real-time driving mode of the host vehicle is not the driving mode, the control device 140 may compare the acceleration error with a second error, and may compare the accumulation value of the acceleration error with a second accumulation value. For example, if the acceleration error exceeds the second error, and the accumulation value of the acceleration error exceeds the second accumulation value, the control device 140 may set (or change) the operating mode as the driving mode. If the acceleration error is smaller than or equal to the second error, or the accumulation value of the acceleration error is smaller than or equal to the second accumulation value, the control device 140 may determine whether the real-time driving mode is an auxiliary braking mode.

For example, if it is determined that the real-time driving mode is an auxiliary braking mode, the control device 140 may compare an acceleration error with a third error, and may compare the accumulation value of the acceleration error with a third accumulation value. For example, if the acceleration error is smaller than the third error, and the accumulation value of the acceleration error is smaller than the third accumulation value, the control device 140 may set the operating mode as the simultaneous braking mode. Alternatively, if the required acceleration exceeds the performance limit of the second braking device, the control device 140 may set (or change) the operating mode as the simultaneous braking mode. For example, if the acceleration error is greater than or equal to the third error or the accumulation value of the acceleration error is greater than or equal to the third accumulation value, and the required acceleration is within the performance limit of the second braking device, the control device 140 may maintain the operating mode as the auxiliary braking mode.

For example, if it is determined that the real-time driving mode is not an auxiliary braking mode (e.g., secondary braking system being used in addition to a primary braking system), the control device 140 may determine the real-time driving mode as the simultaneous braking mode. For another example, the control device 140 may determine, based on the sensor device 120, whether the real-time driving mode is the simultaneous braking mode.

For example, if the real-time driving mode is the simultaneous braking mode, if the acceleration error exceeds a fourth error, the accumulation value of the acceleration error exceeds a fourth accumulation value, and the required acceleration is within the performance limit of the second braking device, the control device 140 may set the operating mode as the auxiliary braking mode. This case may be a case where it is determined that it is sufficient to perform, based on only the second braking device, braking.

For example, if the real-time driving mode is the simultaneous braking mode, if the acceleration error is smaller than or equal to the fourth error, the accumulation value of the acceleration error is smaller than or equal to the fourth accumulation value, or the required acceleration exceeds the performance limit of the second braking device, the control device 140 may maintain the operating mode as the simultaneous braking mode. This case may be a case where it is determined that braking performed based on only the second braking device is insufficient to perform braking according to the required acceleration.

For another example, if the real-time driving mode is the simultaneous braking mode, if the acceleration error is smaller than or equal to the fourth error, the accumulation value of the acceleration error is smaller than or equal to the fourth accumulation value, or the required acceleration exceeds the performance limit of the second braking device, the control device 140 may respectively compare the acceleration error and the accumulation value of the acceleration error with a fifth error and a fifth accumulation value.

For example, if the acceleration error exceeds the fifth error and the accumulation value of the acceleration error exceeds the fifth accumulation value, the control device 140 may set the operating mode as the main braking reduction mode. For another example, if the acceleration error is smaller than or equal to the fifth error, or the accumulation value of the acceleration error is smaller than or equal to the fifth accumulation value, the control device 140 may maintain the operating mode as the simultaneous braking mode.

For example, if it is determined that the real-time driving mode is not the auxiliary braking mode and the simultaneous braking mode, the control device 140 may determine that the real-time driving mode is the main braking reduction mode.

For example, if the real-time driving mode is the main braking reduction mode, if the acceleration error exceeds a sixth error, the control device 140 may set the operating mode as the simultaneous braking mode. For example, if the acceleration error is smaller than or equal to the sixth error, the control device 140 may obtain, based on the sensor device 120, the usage of the first braking device. For example, if the usage of the first braking device is smaller than a specified usage, and the required acceleration is within the performance limit of the second braking device, the control device 140 may set the operating mode as the auxiliary braking mode. If the usage of the first braking device exceeds the specified usage, or the required acceleration exceeds the performance limit of the second braking device, the control device 140 may maintain the operating mode as the main braking reduction mode.

The numerical limitations according to the above-described examples are illustrative, and examples of the present disclosure are not limited thereto. For example, the limitations for driving speed, acceleration, required acceleration, and braking pressure may be examples and may be changed by a developer and/or a user's settings.

Figure 2:
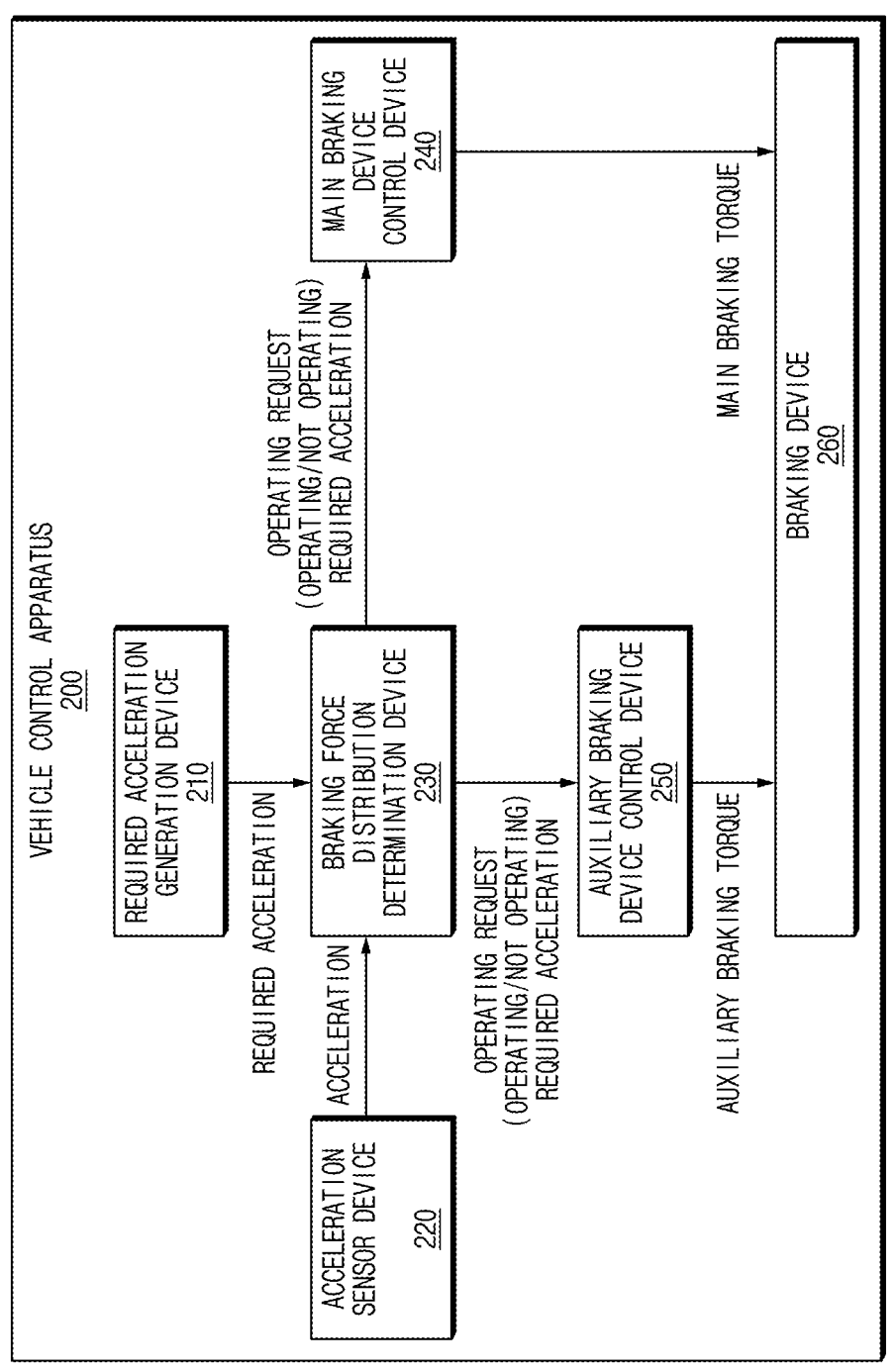
FIG. 2 shows an example shows an example of components and operations of a vehicle control apparatus, according to an example of the present disclosure.

FIG. 2 shows an example shows an example of components and operations of a vehicle control apparatus, according to an example of the present disclosure.

According to an example, a vehicle control apparatus (e.g., the vehicle control apparatus 100 of FIG. 1) may include a required acceleration generation device 210, an acceleration sensor device 220 (e.g., the sensor device 120 in FIG. 1), a braking force distribution determination device 230, a main braking device control device 240, an auxiliary braking device control device 250, and a braking device 260 (e.g., the braking device 110 in FIG. 1). For example, the required acceleration generation device 210, the braking force distribution determination device 230, the main braking device control device 240, and the auxiliary braking device control device 250 may be implemented as one device (e.g., the control device 140 in FIG. 1).

For example, the required acceleration generation device 210 may generate the required acceleration for driving control of the host vehicle.

For example, the acceleration sensor device 220 may obtain at least one of real-time acceleration of the host vehicle, an error between acceleration and required acceleration, or the sum (or an accumulation value of the acceleration error) of acceleration errors (e.g., over-acceleration or under-acceleration) during a specified time, or any combination thereof.

For example, the braking force distribution determination device 230 may determine, based on the required acceleration and the acceleration, the braking force distribution ratio between the main braking device and the auxiliary braking device.

For example, the braking force distribution determination device 230 may transmit the required acceleration and an operating request according to the determined braking force distribution ratio to the main braking device control device 240 and/or the auxiliary braking device control device 250. For example, if the operating mode determined to control a host vehicle is an auxiliary braking mode, the braking force distribution determination device 230 may transmit the operating request for requesting the main braking device control device 240 not to operate.

For example, the main braking device control device 240 and the auxiliary braking device control device 250 may transmit main braking torque and auxiliary braking torque to the main braking device and the auxiliary braking device included in the braking device 260, respectively.

Figure 3A:
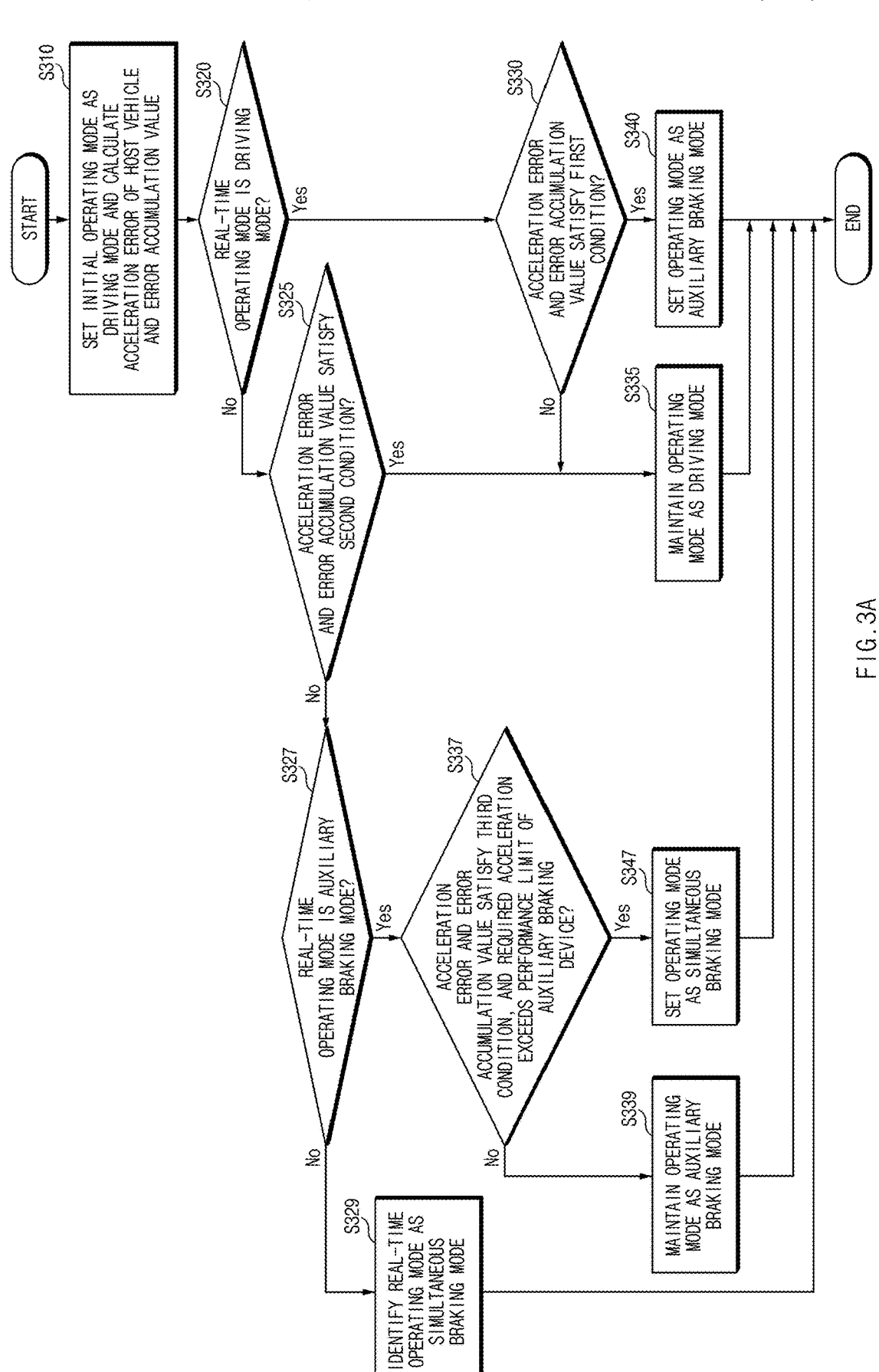
FIG. 3A shows an example of a flowchart of a vehicle control method, according to an example of the present disclosure.

FIG. 3A shows an example of a flowchart of a vehicle control method, according to an example of the present disclosure.

According to an example, a vehicle control apparatus (e.g., the vehicle control apparatus 100 of FIG. 1) may perform operations described in FIG. 3A. For example, at least some of components (e.g., the braking device 110, the sensor device 120, the memory 130, and/or the control device 140 in FIG. 1) included in the vehicle control apparatus may be configured to perform operations of FIG. 3A.

In the following example, operations in S310 to S347 may be sequentially performed, but are not necessarily performed sequentially. For example, the order of operations may be changed, and at least two operations may be performed in parallel. Moreover, descriptions corresponding to or identical to the above-mentioned descriptions given with reference to FIG. 3A may be briefly described or omitted to avoid redundancy.

According to an example, the vehicle control apparatus may set an initial operating mode as a driving mode and may calculate an acceleration error of the host vehicle and an accumulation value of the acceleration error (S310).

According to an example, the vehicle control apparatus may determine whether a real-time operating mode is the driving mode (S320).

For example, if the real-time operating mode is the driving mode (e.g., S320—Yes), the vehicle control apparatus may perform S330.

For example, if the real-time operating mode is not the driving mode (e.g., S320—No), the vehicle control apparatus may perform S325.

According to an example, the vehicle control apparatus may determine whether the acceleration error and the accumulation value of the acceleration error satisfy a first condition (S330).

For example, if the acceleration error is smaller than a first error and the accumulation value of the acceleration error is smaller than a first accumulation value, the vehicle control apparatus may determine that the acceleration error and the accumulation value of the acceleration error satisfy the first condition. A case where the first condition is satisfied may be a case where it is determined that using only an auxiliary braking device (e.g., engine brake, exhaust brake, hydraulic retarder, electric retarder, regenerative brake, etc.) is sufficient to generate braking force according to the required acceleration. A case where the first condition is not satisfied may be a case where acceleration, not braking, is required for the host vehicle.

For example, if the acceleration error and the accumulation value of the acceleration error satisfy the first condition (e.g., S330—Yes), the vehicle control apparatus may perform S340.

For example, if the acceleration error and the accumulation value of the acceleration error do not satisfy the first condition (e.g., S330—No), the vehicle control apparatus may perform S335.

According to an example, the vehicle control apparatus may maintain the operating mode as a driving mode (S335).

According to an example, the vehicle control apparatus may set the operating mode as an auxiliary braking mode (S340).

According to an example, the vehicle control apparatus may determine whether the acceleration error and the accumulation value of the acceleration error satisfy a second condition (S325).

For example, if the acceleration error exceeds a second error and the accumulation value of the acceleration error exceeds a second accumulation value, the vehicle control apparatus may determine that the acceleration error and the accumulation value of the acceleration error satisfy the second condition. For example, a case where the second condition is satisfied may be a case where acceleration, not braking, is required for the host vehicle.

For example, if the acceleration and the accumulation value of the acceleration error satisfy the second condition (e.g., S325—Yes), the vehicle control apparatus may perform S335.

For example, if the acceleration error and the accumulation value of the acceleration error do not satisfy the second condition (e.g., S325—No), the vehicle control apparatus may perform S327.

According to an example, the vehicle control apparatus may determine whether the real-time operating mode is an auxiliary braking mode (S327).

For example, if the real-time operating mode is the auxiliary braking mode (e.g., S327—Yes), the vehicle control apparatus may perform S337.

For example, if the real-time operating mode is not the auxiliary braking mode (e.g., S327—No), the vehicle control apparatus may perform S329.

According to an example, the vehicle control apparatus may identify (or determine) the real-time operating mode as a simultaneous braking mode (S329).

According to an example, the vehicle control apparatus may determine whether the acceleration error and the accumulation value of the acceleration error satisfy a third condition, and the required acceleration exceeds a performance limit of an auxiliary braking device (e.g., engine brake, exhaust brake, hydraulic retarder, electric retarder, regenerative brake, etc.) (S337).

For example, if the acceleration error is smaller than a third error and the accumulation value of the acceleration error is smaller than a third accumulation value, the vehicle control apparatus may determine that the acceleration error and the accumulation value of the acceleration error satisfy the third condition. In this case, the vehicle control apparatus may perform S347. The case may be a case where it is determined that it is insufficient to generate braking force according to the required acceleration based on only the auxiliary braking device.

For example, if the required acceleration exceeds the performance limit of the auxiliary braking device, the vehicle control apparatus may perform S347. The case may be a case where it is determined that it is insufficient to generate braking force according to the required acceleration if the type or performance of the auxiliary braking device is considered.

For example, if the acceleration error and the accumulation value of the acceleration error satisfy the third condition, or the required acceleration exceeds the performance limit of the auxiliary braking device (e.g., S337—Yes), the vehicle control apparatus may perform S347.

For example, if the acceleration error and the accumulation value of the acceleration error do not satisfy the third condition and the required acceleration is within the performance limit of the auxiliary braking device (e.g., S337—No), the vehicle control apparatus may perform S339. This case may be a case where it is determined that braking force according to the required acceleration is generated even based on only an auxiliary braking device.

According to an example, the vehicle control apparatus may maintain the operating mode as the auxiliary braking mode (S339).

According to an example, the vehicle control apparatus may set the operating mode as the simultaneous braking mode (S347).

Figure 3B:
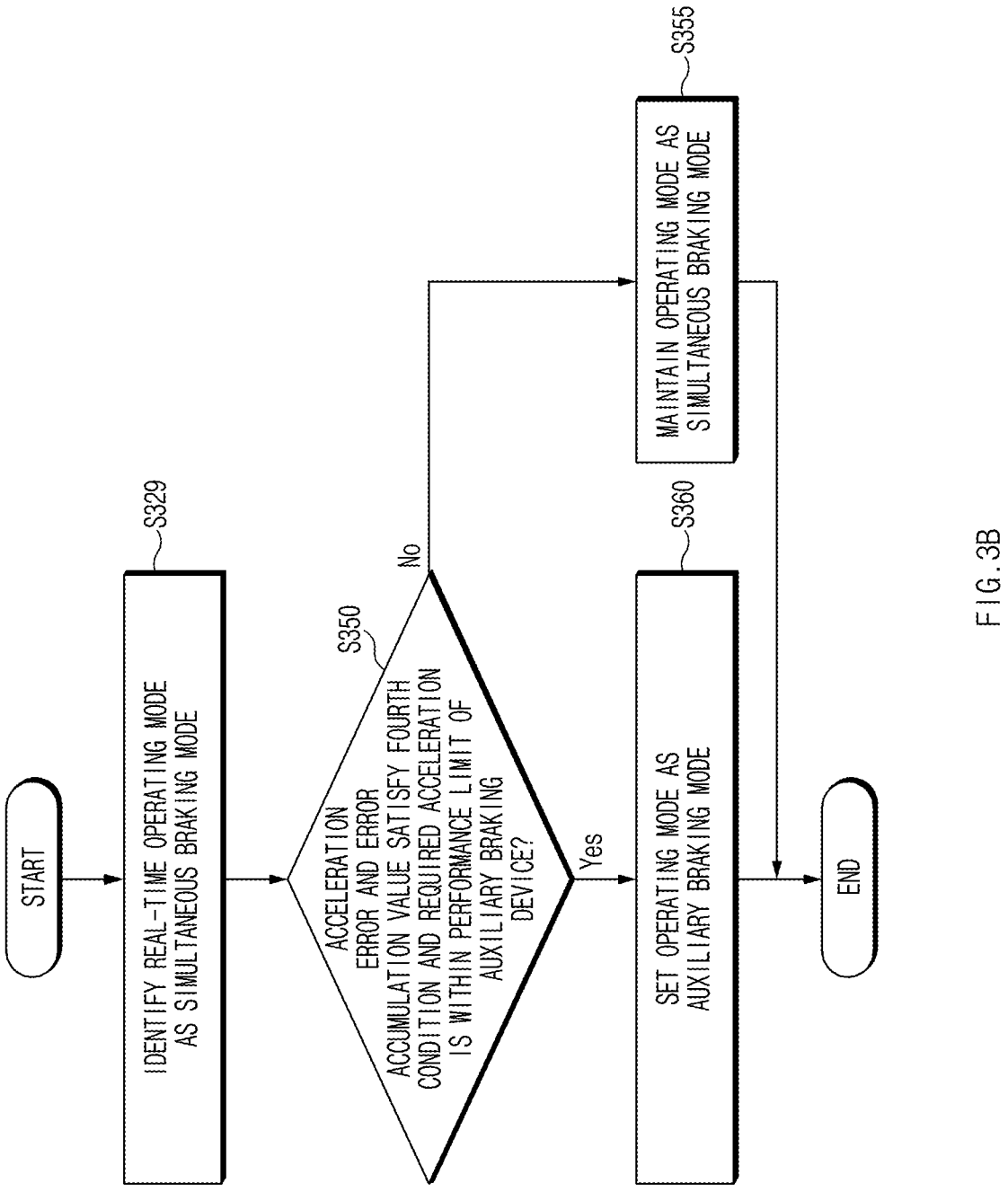
FIG. 3B shows an example of a flowchart of a vehicle control method, according to an example of the present disclosure.

FIG. 3B shows an example of a flowchart of a vehicle control method, according to an example of the present disclosure.

According to an example, a vehicle control apparatus (e.g., the vehicle control apparatus 100 of FIG. 1) may perform operations described in FIG. 3B. For example, at least some of components (e.g., the braking device 110, the sensor device 120, the memory 130, and/or the control device 140 in FIG. 1) included in the vehicle control apparatus may be configured to perform operations of FIG. 3B.

In the following example, operations in S329 to S360 may be sequentially performed, but are not necessarily performed sequentially. For example, the order of operations may be changed, and at least two operations may be performed in parallel. Moreover, descriptions corresponding to or identical to the above-mentioned descriptions given with reference to FIG. 3B may be briefly described or omitted to avoid redundancy.

For example, steps after S329 in FIG. 3B may include steps after S329 in FIG. 3A.

According to an example, the vehicle control apparatus may identify the real-time operating mode as a simultaneous braking mode (S329).

According to an example, the vehicle control apparatus may determine whether the acceleration error (e.g., over-acceleration or under-acceleration) and the accumulation value of the acceleration error satisfy a fourth condition and the required acceleration is within the performance limit of an auxiliary braking device (e.g., engine brake, exhaust brake, hydraulic retarder, electric retarder, regenerative brake, etc.) (S350).

For example, if the acceleration error exceeds a fourth error and the accumulation value of the acceleration error exceeds a fourth accumulation value, the vehicle control apparatus may determine that the acceleration error and the accumulation value of the acceleration error satisfy the fourth condition.

For example, if it is determined that it is sufficient to braking according generate force to the required acceleration based on even using only an auxiliary braking device if the type or performance of the auxiliary braking device is considered, the vehicle control apparatus may determine that the required acceleration is within the performance limit of the auxiliary braking device.

For example, if the acceleration error and the accumulation value of the acceleration error satisfy the fourth condition required acceleration is within the performance limit of the auxiliary braking device (e.g., S35—Yes), the vehicle control apparatus may perform S360.

For example, if the acceleration error and the accumulation value of the acceleration error do not satisfy the fourth condition and the required acceleration exceeds the performance limit of the auxiliary braking device (e.g., S350—No), the vehicle control apparatus may perform S355. The case may be a case where it is determined that it is insufficient to generate braking force according to the required acceleration based on only the auxiliary braking device.

According to an example, the vehicle control apparatus may maintain the operating mode as a simultaneous braking mode (S355).

According to an example, the vehicle control apparatus may set the operating mode as an auxiliary braking mode (S360).

Figure 3C:
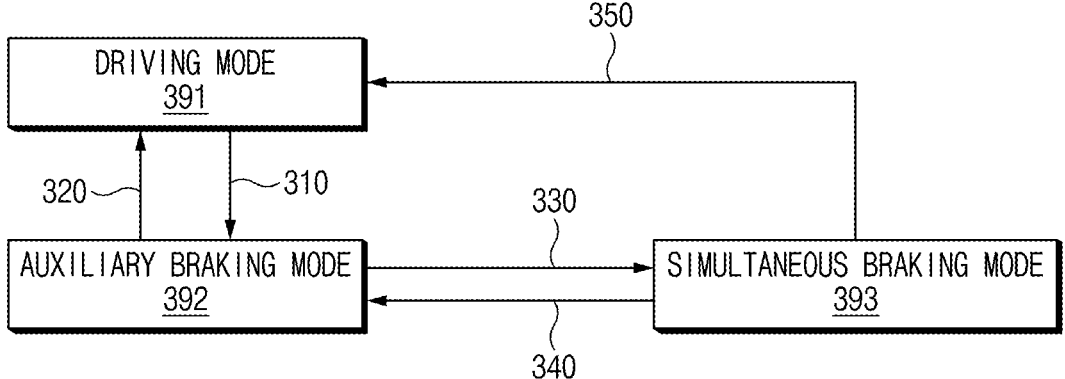
FIG. 3C shows an example of operations of a vehicle control method, according to an example of the present disclosure.

FIG. 3C shows an example of operations of a vehicle control method, according to an example of the present disclosure.

According to an example, a vehicle control apparatus (e.g., the vehicle control apparatus 100 of FIG. 1) may perform driving control on a host vehicle based on at least one operating mode.

For example, the at least one operating mode may include a driving mode 391, an auxiliary braking mode 392, and a simultaneous braking mode 393.

For example, the driving mode 391 may be an operating mode for driving, based on a driving device, the host vehicle while the operation of a braking device is minimized or stopped.

For example, the auxiliary braking mode 392 may be an operating mode for braking, based on only the second braking device (or an auxiliary braking device) among a plurality of braking devices included in the braking device, the host vehicle.

For example, the simultaneous braking mode 393 may be an operating mode for braking, based on both the first braking device (or a main braking device) and the second braking device among the plurality of braking devices included in the braking device, the host vehicle.

Referring to reference number 310, according to an example, if an acceleration error is smaller than a first error and an accumulation value of the acceleration error is smaller than a first accumulation value in a situation where a real-time operating mode of the host vehicle is the driving mode 391, the vehicle control apparatus may set (or change) an operating mode as the auxiliary braking mode 392.

Referring to reference number 320, according to an example, if the acceleration error exceeds a second error and the accumulation value of the acceleration error exceeds a second accumulation value in a situation where the real-time operating mode of the host vehicle is the auxiliary braking mode 392, the vehicle control apparatus may set (or change) the operating mode as the driving mode 391.

Referring to reference number 330, according to an example, if the acceleration error is smaller than a third error and the accumulation value of the acceleration error is smaller than a third accumulation value in a situation where the real-time operating mode of the host vehicle is the auxiliary braking mode 392, the vehicle control apparatus may set (or change) the operating mode as the simultaneous braking mode 393. Alternatively, if it is determined that the required acceleration exceeds the performance limit of an auxiliary braking device, the vehicle control apparatus may set (or change) the operating mode as the simultaneous braking mode 393.

Referring to reference number 340, according to an example, if it is determined that the acceleration error exceeds a fourth error, the accumulation value of the acceleration error exceeds a fourth accumulation value, and the required acceleration is within the performance limit of the auxiliary braking device, in a situation where the real-time operating mode of the host vehicle is the simultaneous braking mode 393, the vehicle control apparatus may set (or change) the operating mode as the auxiliary braking mode 392.

Referring to reference number 350, according to an example, if the acceleration error exceeds the second error and the accumulation value of the acceleration error exceeds the second accumulation value in a situation where the real-time operating mode of the host vehicle is the simultaneous braking mode 393, the vehicle control apparatus may set (or change) the operating mode as the driving mode 391.

Figure 4A:
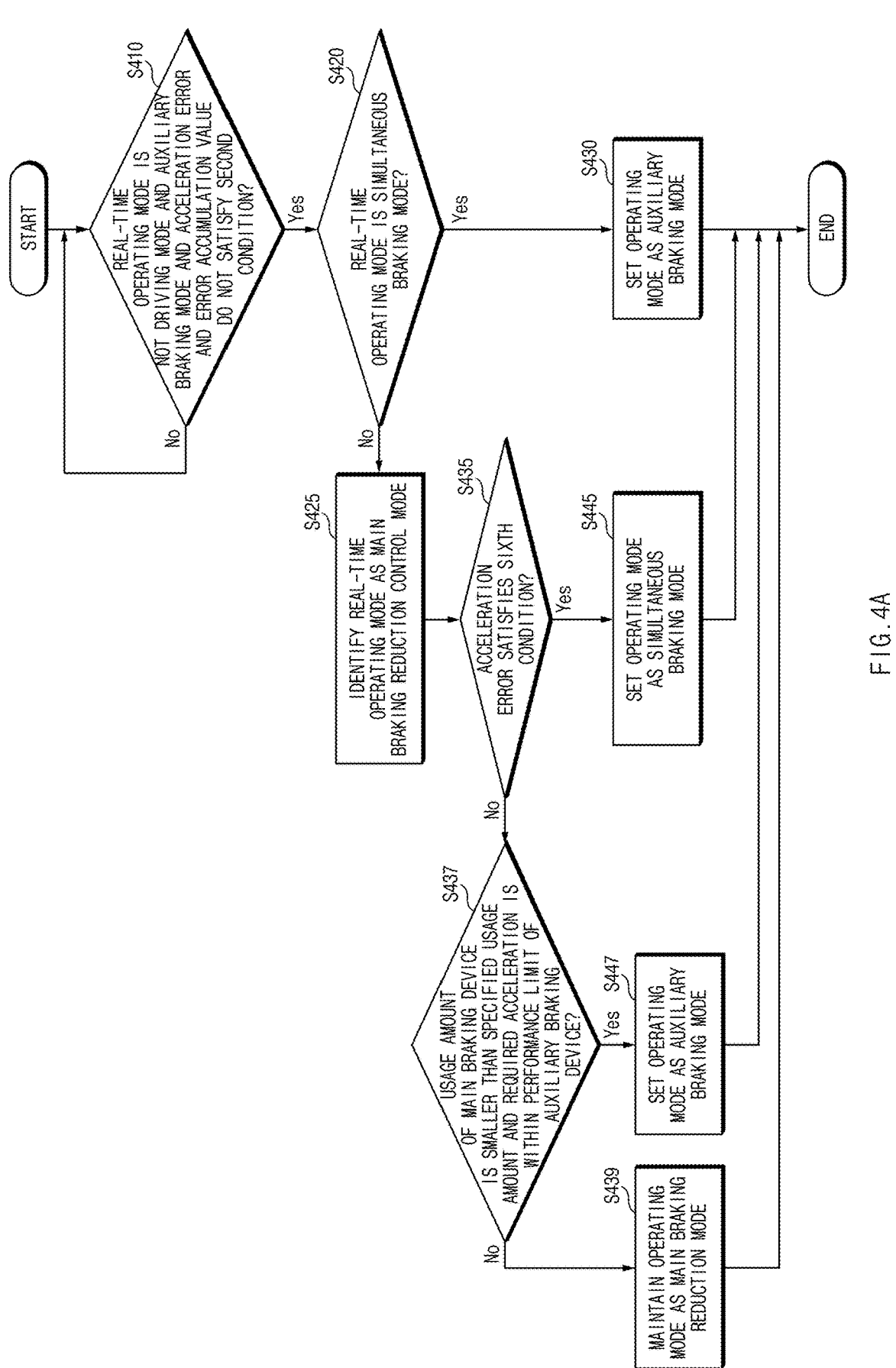
FIG. 4A shows an example of a flowchart of a vehicle control method, according to an example of the present disclosure.

FIG. 4A shows an example of a flowchart of a vehicle control method, according to an example of the present disclosure.

According to an example, a vehicle control apparatus (e.g., the vehicle control apparatus 100 of FIG. 1) may perform operations described in FIG. 4A. For example, at least some of components (e.g., the braking device 110, the sensor device 120, the memory 130, and/or the control device 140 in FIG. 1) included in the vehicle control apparatus may be configured to perform operations of FIG. 4A.

In the following example, S410 to S447 may be sequentially performed, but are not always performed sequentially. For example, the order of operations may be changed, and at least two operations may be performed in parallel. Moreover, descriptions corresponding to or identical to the above-mentioned descriptions given with reference to FIG. 4A may be briefly described or omitted to avoid redundancy.

Figure 4B:
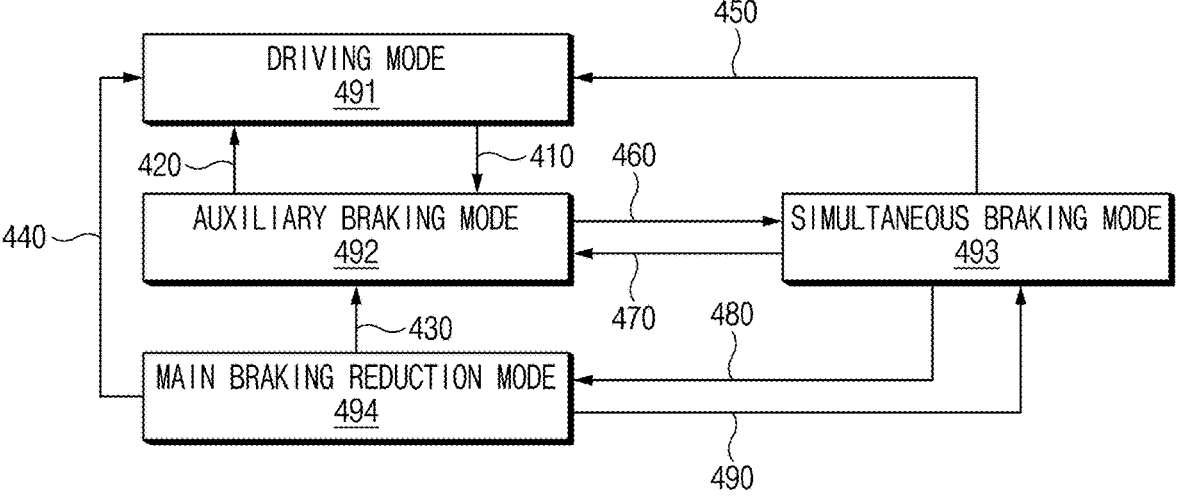
FIG. 4B shows an example of operations of a vehicle control method, according to an example of the present disclosure.

For example, steps after S410 in FIG. 4B may include steps after S329 in FIG. 4A. In other words, if it is identified that a real-time operating mode is not an auxiliary braking mode, the vehicle control apparatus may perform S410 of FIG. 4A.

According to an example, the vehicle control apparatus may determine whether a real-time operating mode is not a driving mode and an auxiliary braking mode and an acceleration error (e.g., over-acceleration or under-acceleration) and an accumulation value of the acceleration error do not satisfy a second condition (S410).

For example, if the real-time operating mode is not the driving mode and the auxiliary braking mode, and the acceleration error and the accumulation value of the acceleration error do not satisfy the second condition (e.g., S410—Yes), the vehicle control apparatus may perform S420.

For example, if the real-time operating mode is the driving mode or the auxiliary braking mode, or the acceleration error and the accumulation value of the acceleration error satisfy the second condition (e.g., S410—No), the vehicle control apparatus may repeat S410. For another example, in this case, the vehicle control apparatus may perform operations according to FIGS. 3A and 3B.

According to an example, the vehicle control apparatus may determine whether the real-time operating mode is a simultaneous braking mode (S420).

For example, if the real-time operating mode is the simultaneous braking mode (e.g., S420—Yes), the vehicle control apparatus may perform S430.

For example, if the real-time operating mode is not the simultaneous braking mode (e.g., S420—No), the vehicle control apparatus may perform S425.

According to an example, the vehicle control apparatus may set the operating mode as an auxiliary braking mode (S430).

According to an example, the vehicle control apparatus may identify the real-time operating mode as the main braking reduction control mode (S425).

According to an example, the vehicle control apparatus may determine whether the acceleration error satisfies a sixth condition (S435).

For example, if the acceleration error exceeds a sixth error, the vehicle control apparatus may determine that the acceleration error and the accumulation value of the acceleration error satisfy the sixth condition. The case may be a case where it is determined that it is insufficient to generate braking force according to the required acceleration if the control amount of the main braking device is reduced.

For example, if the acceleration error satisfies the sixth condition (e.g., S435—Yes), the vehicle control apparatus may perform S445.

For example, if the sixth condition is not satisfied (e.g., S435—No), the vehicle control apparatus may perform S437.

According to an example, the vehicle control apparatus may determine whether the acceleration error satisfies a sixth condition (S435).

For example, if the acceleration error exceeds a sixth error, the vehicle control apparatus may determine that the the accumulation value of the acceleration error and acceleration error satisfy the sixth condition. The case may be a case where it is determined that it is insufficient to generate braking force according to the required acceleration if the control amount of the main braking device is reduced.

For example, if the acceleration error satisfies the sixth condition (e.g., S435—Yes), the vehicle control apparatus may perform S445.

For example, if the acceleration error does not satisfy the sixth condition (e.g., S435—No), the vehicle control apparatus may perform S437.

According to an example, the vehicle control apparatus may set the operating mode as the simultaneous braking mode (S445).

According to an example, the vehicle control apparatus may determine whether a usage of the main braking device is smaller than a specified usage and the required acceleration is within the performance limit (e.g., ability to bring a vehicle to a complete stop from a certain speed with a specific distance for a given weight of the vehicle, time it takes to bring the vehicle to a complete stop from a certain speed after braking is applied, ability of a brake to precisely control the braking force applied, etc.) of an auxiliary braking device (e.g., engine brake, exhaust brake, hydraulic retarder, electric retarder, regenerative brake, etc.) (S437).

For example, if the usage of the main braking device is smaller than the specified usage and the required acceleration is within the performance limit of the auxiliary braking device (e.g., S437—Yes), the vehicle control apparatus may perform S447.

For example, if the usage of the main braking device is greater than or equal to the specified usage and the required acceleration exceeds the performance limit of the auxiliary braking device (e.g., S437—No), the vehicle control apparatus may perform S439.

According to an example, the vehicle control apparatus may maintain the operating mode as the main braking reduction mode (S439).

According to an example, the vehicle control apparatus may set the operating mode as an auxiliary braking mode (S447).

FIG. 4B shows an example of operations of a vehicle control method, according to an example of the present disclosure.

According to an example, a vehicle control apparatus (e.g., the vehicle control apparatus 100 of FIG. 1) may perform driving control on a host vehicle based on at least one operating mode.

For example, the at least one operating mode may include a driving mode 491, an auxiliary braking mode 492, a simultaneous braking mode 493, and a main braking reduction mode 494.

For example, the driving mode 491 may be an operating mode for driving, based on a driving device, the host vehicle while the operation of a braking device is minimized or stopped.

For example, the auxiliary braking mode 492 may be an operating mode for braking, based on only the second braking device (or an auxiliary braking device such as engine brake, exhaust brake, hydraulic retarder, electric retarder, regenerative brake, etc.) among a plurality of braking devices included in the braking device, the host vehicle.

For example, the simultaneous braking mode 493 may be an operating mode for braking, based on both the first braking device (or a main braking device) and the second braking device among the plurality of braking devices included in the braking device, the host vehicle.

For example, the main braking reduction mode 494 may be an operating mode for braking, based on both the first braking device and the second braking device among the plurality of braking devices included in the braking device, the host vehicle, and may be an operating mode for braking, based on reducing the braking force of the first braking device and further using the second braking device, the host vehicle.

In FIG. 4B, the description of a configuration substantially the same as that of FIG. 3C may be replaced with the description of FIG. 3C described above. For example, descriptions of reference numbers 410, 420, 450, 460, and 470 may be replaced with descriptions of reference numbers 310, 320, 350, 330, and 340 in FIG. 3C, respectively.

Referring to reference number 440, according to an example, if the acceleration error exceeds a second error and the accumulation value of the acceleration error exceeds a second accumulation value in a situation where the real-time operating mode of the host vehicle is the main braking reduction mode 494, the vehicle control apparatus may set (or change) the operating mode as the driving mode 491.

Referring to reference number 480, according to an example, if the acceleration error exceeds a fifth error and the accumulation value of the acceleration error exceeds a fifth accumulation value in a situation where the real-time operating mode of the host vehicle is the simultaneous braking mode 493, the vehicle control apparatus may set (or change) the operating mode as the main braking reduction mode 494.

Referring to reference number 490, according to an example, if the acceleration error exceeds a sixth error in a situation where the real-time operating mode of the host vehicle is the main braking reduction mode 494, the vehicle control apparatus may set (or change) the operating mode as the simultaneous braking mode 493.

FIG. 5 shows an example of a flowchart of a vehicle control method, according to an example of the present disclosure.

According to an example, a vehicle control apparatus (e.g., the vehicle control apparatus 100 of FIG. 1) may perform operations described in FIG. 5. For example, at least some of components (e.g., the braking device 110, the sensor device 120, the memory 130, and/or the control device 140 in FIG. 1) included in the vehicle control apparatus may be configured to perform operations of FIG. 5.

In the following example, S510 to S540 may be sequentially performed, but are not always performed sequentially. For example, the order of operations may be changed, and at least two operations may be performed in parallel. Moreover, descriptions corresponding to or identical to the above-mentioned descriptions given with reference to FIG. 5 may be briefly described or omitted to avoid redundancy.

According to an example, the vehicle control apparatus may set an initial operating mode for driving of a host vehicle as a driving mode (S510).

According to an example, the vehicle control apparatus may obtain an acceleration error of the host vehicle, an accumulation value of the acceleration error, a type of a real-time driving mode of the host vehicle, and required acceleration (S520).

According to an example, the vehicle control apparatus may compare the acceleration error and a magnitude of the accumulation value of the acceleration error with at least one reference value (S530).

According to an example, the vehicle control apparatus may set the operating mode as at least one of a driving mode, an auxiliary braking mode, a simultaneous braking mode, or a main braking reduction mode, or any combination thereof based on the type of the real-time driving mode and the required acceleration as the comparison result (S540).

Figure 6:
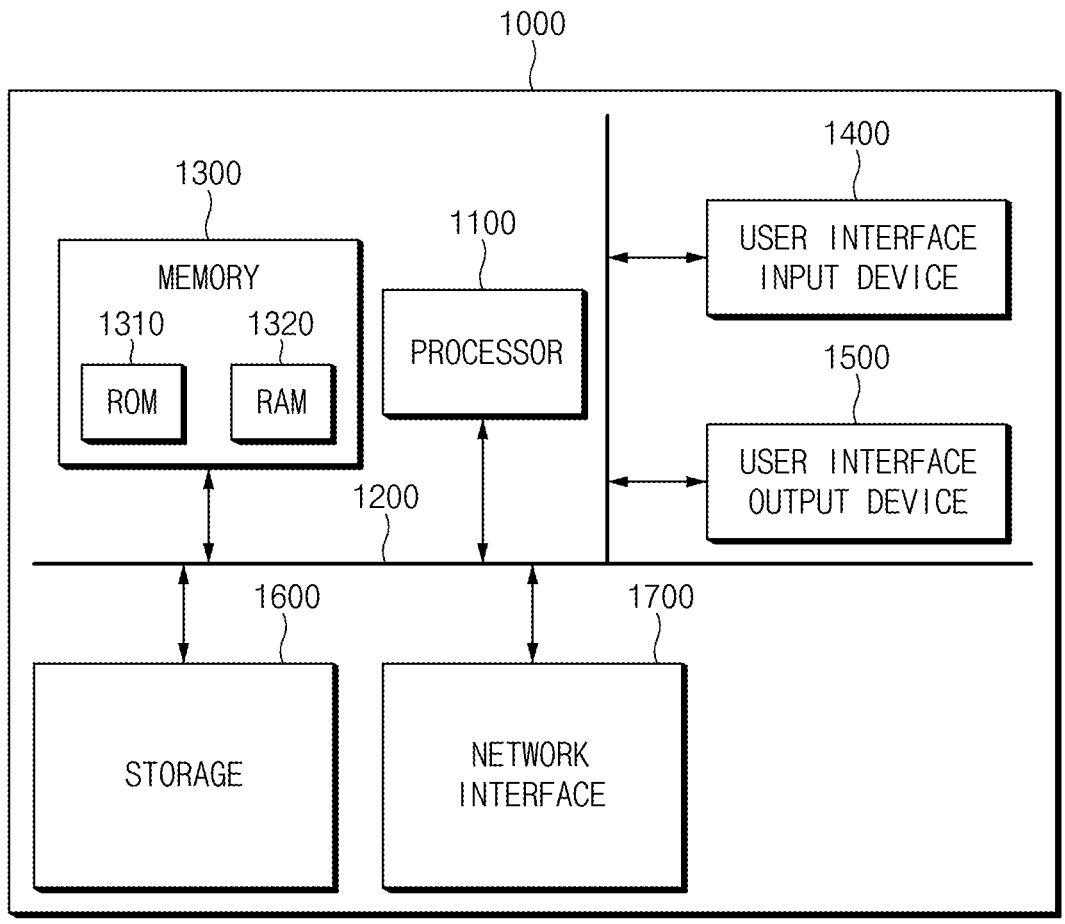
FIG. 6 shows an example of a computing system related to a vehicle control apparatus or vehicle control method, according to an example of the present disclosure.

FIG. 6 shows an example of a computing system related to a vehicle control apparatus or vehicle control method, according to an example of the present disclosure.

Referring to FIG. 6, a computing system 1000 related to a vehicle control apparatus or a vehicle control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

The present disclosure was made to solve the above-mentioned problems occurring in the prior art while advantages achieved by the prior art are maintained intact.

An example of the present disclosure provides a vehicle control apparatus that may flexibly determine, based on only required acceleration, an error between real-time acceleration of a host vehicle and the required acceleration, an accumulation value of an acceleration error, and the performance limit of the auxiliary braking device, an operating mode using a main braking device and/or an auxiliary braking device.

An example of the present disclosure provides each of the main braking device and/or the auxiliary braking device that may independently generate braking torque and operate according to the determined operating mode, thereby naturally distributing braking force and relatively increasing the accuracy for following the required acceleration.

An example of the present disclosure provides a vehicle control apparatus that may distribute braking force based on a relatively simple algorithm, may not require an additional sensor, and may include the relatively small amount of calculation, thereby reducing the cost and time to implement adaptive braking control.

The technical problems to be solved by the present disclosure are not limited to the aforementioned problems, and any other technical problems not mentioned herein will be clearly understood the following description by those skilled in the art to which the present disclosure pertains.

According to an example of the present disclosure, a vehicle control apparatus may include a braking device including a first braking device and a second braking device, a sensor device, a memory that stores at least one instruction, and a control device operatively connected to the braking device, the sensor device, and the memory. For example, if executed by the control device, the at least one instruction may cause the vehicle control apparatus to set an initial operating mode for driving of a host vehicle as a driving mode, to obtain, based on the sensor device, an acceleration error of the host vehicle, an accumulation value of the acceleration error, and a type of a real-time driving mode of the host vehicle, and required or desired acceleration, to compare the acceleration error and a magnitude of the accumulation value of the acceleration error with at least one reference value, to set an operating mode of the host vehicle as at least one of the driving mode, an auxiliary braking mode, a simultaneous braking mode, or a main braking reduction mode, or any combination thereof based on the type of the real-time driving mode and the required or desired acceleration as the comparison result, and to control the host vehicle based on the operating mode.

According to an example, if executed by the control device, the at least one instruction may cause the vehicle control apparatus to obtain, based on the sensor device, braking device information including a usage of the first braking device, and whether the required or desired acceleration matches a performance limit of the second braking device; and to set the operating mode further based on the braking device information.

According to an example, if executed by the control device, the at least one instruction may cause the vehicle control apparatus, if it s determined that the real-time driving mode of the host vehicle is the driving mode, to set the operating mode as the auxiliary braking mode if the acceleration error is smaller than a first error and the accumulation value of the acceleration error is smaller than a first accumulation value, and to maintain the operating mode as the driving mode if the acceleration error is greater than or equal to the first error or the accumulation value of the acceleration error is greater than or equal to the first accumulation value.

According to an example, if executed by the control device, the at least one instruction may cause the vehicle apparatus, if it is determined that the real-time control driving mode of the host vehicle is not the driving mode, to set the operating mode as the driving mode if the acceleration error exceeds a second error, and the accumulation value of the acceleration error exceeds a second accumulation value, and to determine whether the real-time driving mode is the auxiliary braking mode if the acceleration error is smaller than or equal to the second error, or the accumulation value of the acceleration error is smaller than or equal to the second accumulation value.

According to an example, if executed by the control device, the at least one instruction may cause the vehicle control apparatus, if it is determined that the real-time driving mode is the auxiliary braking mode, to set the operating mode as the simultaneous braking mode if the acceleration error is smaller than a third error and the accumulation value of the acceleration error is smaller than a third accumulation value, or the required or desired acceleration exceeds a performance limit of the second braking device, and to maintain the operating mode as the auxiliary braking mode if the acceleration error is greater than or equal to the third error, the accumulation value of the acceleration error is greater than or equal to the third accumulation value, and the required or desired acceleration is within the performance limit of the second braking device.

According to an example, if executed by the control device, the at least one instruction may cause the vehicle control apparatus to determine the real-time driving mode as the simultaneous braking mode if it is determined that the real-time driving mode is not the auxiliary braking mode, to set the operating mode as the auxiliary braking mode if the acceleration error exceeds a fourth error, the accumulation value of the acceleration error exceeds a fourth accumulation value, and the required or desired acceleration is within a performance limit of the second braking device, and to maintain the operating mode as the simultaneous braking mode if the acceleration error is smaller than or equal to the fourth error, the accumulation value of the acceleration error is smaller than or equal to the fourth accumulation value, or the required or desired acceleration exceeds the performance limit of the second braking device.

According to an example, if executed by the control device, the at least one instruction may cause the vehicle control apparatus, if the acceleration error is smaller than or equal to the fourth error, the accumulation value of the acceleration error is smaller than or equal to the fourth accumulation value, or the required or desired acceleration exceeds the performance limit of the second braking device, to set the operating mode as the main braking reduction mode if the acceleration error exceeds a fifth error and the accumulation value of the acceleration error exceeds a fifth accumulation value, and to maintain the operating mode as the simultaneous braking mode if the acceleration error is smaller than or equal to the fifth error, or the accumulation value of the acceleration error is smaller than or equal to the fifth accumulation value.

According to an example, if executed by the control device, the at least one instruction may cause the vehicle control apparatus to determine the real-time driving mode as the main braking reduction mode if it is determined that the real-time driving mode is not the auxiliary braking mode and the simultaneous braking mode, and to set the operating mode as the simultaneous braking mode if the acceleration error exceeds a sixth error.

According to an example, if executed by the control device, the at least one instruction may cause the vehicle control apparatus to obtain, based on the sensor device, a usage of the first braking device if the acceleration error is smaller than or equal to the sixth error, and to set the operating mode as the auxiliary braking mode if the usage is smaller than a specified usage, and the required or desired acceleration is within the performance limit of the second braking device.

According to an example, if executed by the control device, the at least one instruction may cause the vehicle control apparatus to obtain, based on the sensor device, a usage of the first braking device if the acceleration error is smaller than or equal to the sixth error, and to maintain the operating mode as the main braking reduction mode if the usage exceeds a specified usage, or the required or desired acceleration exceeds the performance limit of the second braking device.

According to an example of the present disclosure, a vehicle control method may include setting, by a control device, an initial operating mode for driving of a host vehicle as a sensor driving obtaining, based on a device, an acceleration error of the host vehicle, an accumulation value of the acceleration error, and a type of a real-time driving mode of the host vehicle, and required or desired acceleration by the control device, comparing, by the control device, the acceleration error and a magnitude of the accumulation value of the acceleration error with at least one reference value, setting, by the control device, an operating mode of the host vehicle as at least one of the driving mode, an auxiliary braking mode, a simultaneous braking mode, or a main braking reduction mode, or any combination thereof based on the type of the real-time driving mode and the required or desired acceleration as the comparison result, and controlling, by the control device, the host vehicle based on the operating mode.

According to an example, the vehicle control method may further include obtaining, based on the sensor device, braking device information including a usage of a first braking device, and whether the required or desired acceleration matches a performance limit of a second braking device, by the control device, and setting the operating mode further based on the braking device information.

According to an example, the vehicle control method may further include, if it is determined that the real-time driving mode of the host vehicle is the driving mode, setting, by the control device, the operating mode as the auxiliary braking mode if the acceleration error is smaller than a first error and the accumulation value of the acceleration error is smaller than a first accumulation value, and maintaining, by the control device, the operating mode as the driving mode if the acceleration error is greater than or equal to the first error or the accumulation value of the acceleration error is greater than or equal to the first accumulation value.

According to an example, the vehicle control method may further include, if it is determined that the real-time driving mode of the host vehicle is not the driving mode, setting, by the control device, the operating mode as the driving mode if the acceleration error exceeds a second error, and the accumulation value of the acceleration error exceeds a second accumulation value, and determining, by the control device, whether the real-time driving mode is the auxiliary braking mode if the acceleration error is smaller than or equal to the second error, or the accumulation value of the acceleration error is smaller than or equal to the second accumulation value.

According to an example, the vehicle control method may further include, if it is determined that the real-time driving mode is the auxiliary braking mode, setting, by the control device, the operating mode as the simultaneous braking mode if the acceleration error is smaller than a third error and the accumulation value of the acceleration error is smaller than a third accumulation value, or the required or desired acceleration exceeds a performance limit of a second braking device, and maintaining, by the control device, the operating mode as the auxiliary braking mode if the acceleration error is greater than or equal to the third error, the accumulation value of the acceleration error is greater than or equal to the third accumulation value, and the required or desired acceleration is within the performance limit of the second braking device.

According to an example, the vehicle control method may further include determining, by the control device, the real-time driving mode as the simultaneous braking mode if it is determined that the real-time driving mode is not the auxiliary braking mode, setting, by the control device, the operating mode as the auxiliary braking mode if the acceleration error exceeds a fourth error, the accumulation value of the acceleration error exceeds a fourth accumulation value, and the required or desired acceleration is within a performance limit of a second braking device, and maintaining, by the control device, the operating mode as the simultaneous braking mode if the acceleration error is smaller than or equal to the fourth error, the accumulation value of the acceleration error is smaller than or equal to the fourth accumulation value, or the required or desired acceleration exceeds the performance limit of the second braking device.

According to an example, the vehicle control method may further include, if the acceleration error is smaller than or equal to the fourth error, the accumulation value of the acceleration error is smaller than or equal to the fourth accumulation value, or the required or desired acceleration exceeds the performance limit of the second braking device, setting, by the control device, the operating mode as the main braking reduction mode if the acceleration error exceeds a fifth error and the accumulation value of the acceleration error exceeds a fifth accumulation value, and maintaining, by the control device, the operating mode as the simultaneous braking mode if the acceleration error is smaller than or equal to the fifth error, or the accumulation value of the acceleration error is smaller than or equal to the fifth accumulation value.

According to an example, the vehicle control method may further include determining, by the control device, the real-time driving mode as the main braking reduction mode if it is determined that the real-time driving mode is not the auxiliary braking mode and the simultaneous braking mode, and setting, by the control device, the operating mode as the simultaneous braking mode if the acceleration error exceeds a sixth error.

According to an example, the vehicle control method may further include obtaining, based on the sensor device, a usage of a first braking device by the control device if the acceleration error is smaller than or equal to the sixth error, and setting, by the control device, the operating mode as the auxiliary braking mode if the usage is smaller than a specified usage, and the required or desired acceleration is within the performance limit of the second braking device.

According to an example, the vehicle control method may further include obtaining, based on the sensor device, a usage of a first braking device by the control device if the acceleration error is smaller than or equal to the sixth error, and maintaining, by the control device, the operating mode as the main braking reduction mode if the usage exceeds a specified usage, or the required or desired acceleration exceeds the performance limit of the second braking device.

Accordingly, examples of the present disclosure are intended not to limit but to explain the technical idea of the present disclosure, and the scope and spirit of the present disclosure is not limited by the above examples. The scope of protection of the present disclosure should be construed by the attached claims, and all equivalents thereof should be construed as being included within the scope of the present disclosure.

Descriptions of a vehicle control apparatus according to an example of the present disclosure, and a method therefor are as follows.

According to various examples of the present disclosure, a vehicle control apparatus may flexibly determine, based on only required or desired acceleration, an error between real-time acceleration of a host vehicle and the required or desired acceleration, an accumulation value of an acceleration error, and the performance limit of the auxiliary braking device, an operating mode using a main braking device and/or an auxiliary braking device.

According to various examples of the present disclosure, each of the main braking device and/or the auxiliary braking device may independently generate braking torque and operate according to the determined operating mode, thereby naturally relatively: increasing the distributing braking force and accuracy for following the required acceleration.

According to various examples of the present disclosure, a vehicle control apparatus may distribute braking force based on a relatively simple algorithm, may not require an additional sensor, and may include the relatively small amount of calculation, thereby reducing the cost and time to implement adaptive braking control.

According to various examples of the present disclosure, a vehicle control apparatus may prevent over-braking and/or under-braking occurring during the transition between usage modes of the first braking device and the second braking device, and may perform braking control that more accurately follows the required acceleration.

Besides, a variety of effects directly or indirectly understood through the present disclosure may be provided.

Hereinabove, although the present disclosure was described with reference to examples and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
a first braking device and a second braking device;
a sensor device;
a memory configured to store at least one instruction; and
a control device operatively coupled to the first braking device, the second braking device, the sensor device, and the memory,
wherein the at least one instruction, if executed by the control device, causes the apparatus to:
set an operating mode of a vehicle as a driving mode;
based on information from the sensor device, obtain an acceleration error value of the vehicle, an accumulated value of acceleration error, a type of a real-time driving mode of the vehicle, and required acceleration;
compare the acceleration error value, a magnitude of the accumulated value of the acceleration error, and at least one reference value;
set, based on the comparison, the required acceleration, and the type of the real-time driving mode, the operating mode of the vehicle as at least one of the driving mode, an auxiliary braking mode, a simultaneous braking mode, or a main braking reduction mode; and
output, based on the operating mode, a signal for an operation control of the vehicle.

2. The apparatus of claim 1, wherein the at least one instruction, if executed by the control device, causes the apparatus to:
obtain, based on information from the sensor device, braking device information comprising usage information of the first braking device and information about whether the required acceleration matches a performance limit of the second braking device; and

26 set, further based on the braking device information, the operating mode.

3. The apparatus of claim 1, wherein the at least one instruction, if executed by the control device, causes the apparatus to:
based on the real-time driving mode of the vehicle being the driving mode:
set, based on the acceleration error value being smaller than a first error value and the accumulated value of the acceleration error being smaller than a first accumulation value, the operating mode as the auxiliary braking mode; and
maintain, based on the acceleration error value being greater than or equal to the first error value or the accumulated value of the acceleration error being greater than or equal to the first accumulation value, the operating mode as the driving mode.

4. The apparatus of claim 1, wherein the at least one instruction, if executed by the control device, causes the apparatus to:
based on the real-time driving mode of the vehicle not being the driving mode:
set, based on the acceleration error value exceeding a second error value and the accumulated value of the acceleration error exceeding a second accumulation value, the operating mode as the driving mode; and
determine, based on the acceleration error value being smaller than or equal to the second error value, or the accumulated value of the acceleration error being smaller than or equal to the second accumulation value, whether the real-time driving mode is the auxiliary braking mode.

5. The apparatus of claim 4, wherein the at least one instruction, if executed by the control device, causes the apparatus to:
based on the real-time driving mode being the auxiliary braking mode:
set, based on the acceleration error value being smaller than a third error value and the accumulated value of the acceleration error being smaller than a third accumulation value, or the required acceleration exceeding a performance limit of the second braking device, the operating mode as the simultaneous braking mode; and
maintain, based on the acceleration error value being greater than or equal to the third error value, the accumulated value of the acceleration error being greater than or equal to the third accumulation value, and the required acceleration being within the performance limit of the second braking device, the operating mode as the auxiliary braking mode.

6. The apparatus of claim 4, wherein the at least one instruction, if executed by the control device, causes the apparatus to:
determine, based on the real-time driving mode not being the auxiliary braking mode, the real-time driving mode as the simultaneous braking mode;
set, based on the acceleration error value exceeding a fourth error value, the accumulated value of the acceleration error exceeding a fourth accumulation value, and the required acceleration being within a performance limit of the second braking device, the operating mode as the auxiliary braking mode; and
maintain, based on the acceleration error value being smaller than or equal to the fourth error value, the accumulated value of the acceleration error being smaller than or equal to the fourth accumulation value, or the required acceleration exceeding the performance limit of the second braking device, the operating mode as the simultaneous braking mode.

7. The apparatus of claim 6, wherein the at least one instruction, if executed by the control device, causes the apparatus to:

based on the acceleration error value being smaller than or equal to the fourth error value, the accumulated value of the acceleration error being smaller than or equal to the fourth accumulation value, or the required acceleration exceeding the performance limit of the second braking device:

set, based on the acceleration error value exceeding a fifth error value and the accumulated value of the acceleration error exceeding a fifth accumulation value, the operating mode as the main braking reduction mode; and maintain, based on the acceleration error value being smaller than or equal to the fifth error value or the accumulated value of the acceleration error being smaller than or equal to the fifth accumulation value, the operating mode as the simultaneous braking mode.

8. The apparatus of claim 6, wherein the at least one instruction, if executed by the control device, causes the apparatus to:

determine, based on the real-time driving mode not being the auxiliary braking mode or the simultaneous braking mode, the real-time driving mode as the main braking reduction mode; and set, based on the acceleration error value exceeding a sixth error value, the operating mode as the simultaneous braking mode.

9. The apparatus of claim 8, wherein the at least one instruction, if executed by the control device, causes the apparatus to:

obtain, based on information from the sensor device and the acceleration error value being smaller than or equal to the sixth error value, a usage value of the first braking device; and set, based on the usage value being smaller than a specified usage value and the required acceleration being within the performance limit of the second braking device, the operating mode as the auxiliary braking mode.

10. The apparatus of claim 8, wherein the at least one instruction, if executed by the control device, causes the apparatus to:

obtain, based on information from the sensor device and the acceleration error value being smaller than or equal to the sixth error value, a usage value of the first braking device; and maintain, based on the usage value exceeding a specified usage value or the required acceleration exceeding the performance limit of the second braking device, the operating mode as the main braking reduction mode.

11. A method comprising:

setting, by a control device, an operating mode of a vehicle as a driving mode;

based on information from a sensor device, obtaining an acceleration error value of the vehicle, an accumulated value of acceleration error, a type of a real-time driving mode of the vehicle, and required acceleration;

comparing, by the control device, the acceleration error value a magnitude of the accumulated value of the acceleration error, and at least one reference value;

setting, by the control device, based on the comparing, the required acceleration, and the type of the real-time driving mode, an operating mode of the vehicle as at least one of the driving mode, an auxiliary braking mode, a simultaneous braking mode, or a main braking reduction mode; and outputting, by the control device, based on the operating mode, a signal for an operation control of the vehicle.

12. The method of claim 11, further comprising:

obtaining, by the control device, based on information the sensor device, braking device information comprising usage information of a first braking device and information about whether the required acceleration matches a performance limit of a second braking device; and setting, further based on the braking device information, the operating mode.

13. The method of claim 11, further comprising:

based on the real-time driving mode of the vehicle being the driving mode:

setting, by the control device, based on the acceleration error value being smaller than a first error value and the accumulated value of the acceleration error being smaller than a first accumulation value, the operating mode as the auxiliary braking mode; or maintaining, by the control device, the operating mode as the driving mode based on the acceleration error value being greater than or equal to the first error value or the accumulated value of the acceleration error being greater than or equal to the first accumulation value.

14. The method of claim 11, further comprising:

based on the real-time driving mode of the vehicle not being the driving mode:

setting, by the control device, based on the acceleration error value exceeding a second error value and the accumulated value of the acceleration error exceeding a second accumulation value, the operating mode as the driving mode; or determining, by the control device, based on the acceleration error value being smaller than or equal to the second error value or the accumulated value of the acceleration error being smaller than or equal to the second accumulation value, whether the real-time driving mode is the auxiliary braking mode.

15. The method of claim 14, further comprising:

based on the real-time driving mode being the auxiliary braking mode:

setting, by the control device, based on the acceleration error value being smaller than a third error value and the accumulated value of the acceleration error being smaller than a third accumulation value or the required acceleration exceeding a performance limit of a second braking device, the operating mode as the simultaneous braking mode; or maintaining, by the control device, based on the acceleration error value being greater than or equal to the third error value, the accumulated value of the acceleration error being greater than or equal to the third accumulation value, and the required acceleration being within the performance limit of the second braking device, the operating mode as the auxiliary braking mode.

16. The method of claim 14, further comprising:

determining, by the control device, based on the real-time driving mode not being the auxiliary braking mode, the real-time driving mode as the simultaneous braking mode;

setting, by the control device, based on the acceleration error value exceeding a fourth error value, the accumulated value of the acceleration error exceeding a fourth accumulation value, and the required acceleration being within a performance limit of a second braking device, the operating mode as the auxiliary braking mode; or maintaining, by the control device, based on the acceleration error value being smaller than or equal to the fourth error value, the accumulated value of the acceleration error being smaller than or equal to the fourth accumulation value, or the required acceleration exceeding the performance limit of the second braking device, the operating mode as the simultaneous braking mode.

17. The method of claim 16, further comprising:

based on the acceleration error value being smaller than or equal to the fourth error value, the accumulated value of the acceleration error being smaller than or equal to the fourth accumulation value, or the required acceleration exceeding the performance limit of the second braking device:

setting, by the control device, based on the acceleration error value exceeding a fifth error value and the accumulated value of the acceleration error exceeding a fifth accumulation value, the operating mode as the main braking reduction mode; or maintaining, by the control device, based on the acceleration error value being smaller than or equal to the fifth error value or the accumulated value of the acceleration error being smaller than or equal to the fifth accumulation value, the operating mode as the simultaneous braking mode.

18. The method of claim 16, further comprising:

determining, by the control device, based on the real-time driving mode not being the auxiliary braking mode or the simultaneous braking mode, the real-time driving mode as the main braking reduction mode; or setting, by the control device, based on the acceleration error value exceeding a sixth error value, the operating mode as the simultaneous braking mode.

19. The method of claim 18, further comprising:

obtaining, by the control device, based on information from the sensor device and the acceleration error value being smaller than or equal to the sixth error value, a usage value of a first braking device; and setting, by the control device, based on the usage value being smaller than a specified usage value and the required acceleration being within the performance limit of the second braking device, the operating mode as the auxiliary braking mode.

20. A vehicle comprising:

a sensor;

a memory configured to store at least one instruction; and a processor configured to execute the at least one instruction, wherein the processor, by executing the at least one instruction, is configured to cause the vehicle to:

based on information from the sensor, obtain an acceleration error value of the vehicle, an accumulated value of acceleration error, and required acceleration;

compare the acceleration error value, a magnitude of the accumulated value of the acceleration error, and at least one reference value;

based on the comparison and the required acceleration, set an operating mode of the vehicle of a plurality of operating modes of the vehicle; and output, based on the operating mode, a signal for an operation control of the vehicle.

* * * * *